United States Patent
Liang et al.

(10) Patent No.: US 9,065,320 B2
(45) Date of Patent: Jun. 23, 2015

(54) PASSIVE DRIVE MOTORS AND PASSIVE FANS FOR USE THEREWITH

(75) Inventors: Jia-Yuan Liang, Taoyuan Hsien (TW); Kun-Fu Chuang, Taoyuan Hsien (TW); Shun-Chen Chang, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 275 days.

(21) Appl. No.: 13/605,865

(22) Filed: Sep. 6, 2012

(65) Prior Publication Data

US 2013/0094981 A1   Apr. 18, 2013

(30) Foreign Application Priority Data

Oct. 18, 2011   (TW) .............................. 100137610 A (51) Int. Cl.
| | |
|---|---|
| *H02K 49/04* | (2006.01) |
| *F04D 25/08* | (2006.01) |
| *H02K 49/10* | (2006.01) |
| *F04D 25/02* | (2006.01) |
| *F04D 25/06* | (2006.01) |
| *H02K 7/11* | (2006.01) |

(52) U.S. Cl.
CPC .............. *H02K 49/108* (2013.01); *H02K 49/10* (2013.01); *H02K 49/102* (2013.01); *H02K 49/104* (2013.01); *F04D 25/026* (2013.01); *F04D 25/0633* (2013.01); *H02K 49/043* (2013.01); *H02K 49/046* (2013.01); *H02K 49/106* (2013.01); *H02K 7/11* (2013.01)

(58) Field of Classification Search
CPC ....... F04D 13/06; F04D 13/024; F04D 13/62; F04D 13/066; F04D 29/281; F04C 15/0069; H02K 49/10; H02K 49/102; H02K 49/104; H02K 49/106; H02K 49/108
USPC ......... 417/420, 423, 423.1, 336, 338; 415/62, 415/66; 310/103, 105
See application file for complete search history.

(56) References Cited

U.S. PATENT DOCUMENTS

| | | | | |
|---|---|---|---|---|
| 7,438,120 | B2* | 10/2008 | Hong et al. .................. | 165/80.4 |
| 7,780,422 | B2* | 8/2010 | Berroth ......................... | 417/420 |
| 7,871,254 | B2* | 1/2011 | Ito ................................. | 418/55.3 |
| 2002/0090308 | A1* | 7/2002 | Cheng ......................... | 417/423.1 |
| 2011/0073159 | A1* | 3/2011 | Shen et al. .................... | 136/246 |
| 2011/0223042 | A1* | 9/2011 | Chang et al. ................. | 417/313 |

FOREIGN PATENT DOCUMENTS

| | | | |
|---|---|---|---|
| CN | 1937211 A | | 3/2007 |
| EP | 2365225 A2 | * | 9/2011 |

* cited by examiner

*Primary Examiner* — Devon Kramer
*Assistant Examiner* — Stephen Mick
(74) *Attorney, Agent, or Firm* — Muncy, Geissler, Olds & Lowe, P.C.

(57) ABSTRACT

A passive drive motor is disclosed. A stator assembly is connected to a base. A rotating shaft is rotatably connected to the base. A rotor assembly is connected to the rotating shaft. The rotor assembly interacts with the stator assembly to rotate the rotating shaft. A first metal disk is rotated by the rotating shaft. At least one first magnet pair is disposed on the first metal disk. A second metal disk opposes the first magnet pair. When the rotating shaft rotates to drive the first metal disk to rotate, the first magnet pair disposed on the first metal disk magnetically interacts with the second metal disk, driving the second metal disk to rotate with respect to the first metal disk.

17 Claims, 13 Drawing Sheets

PASSIVE DRIVE MOTORS AND PASSIVE FANS FOR USE THEREWITH

CROSS REFERENCE TO RELATED APPLICATIONS

This Application claims priority of Taiwan Patent Application No. 100137610, filed on Oct. 18, 2011, the entirety of which is incorporated by reference herein.

BACKGROUND OF THE INVENTION

1. Field of the Invention

The invention relates to passive drive motors, and more particularly to passive fans.

2. Description of the Related Art

Figure 1:
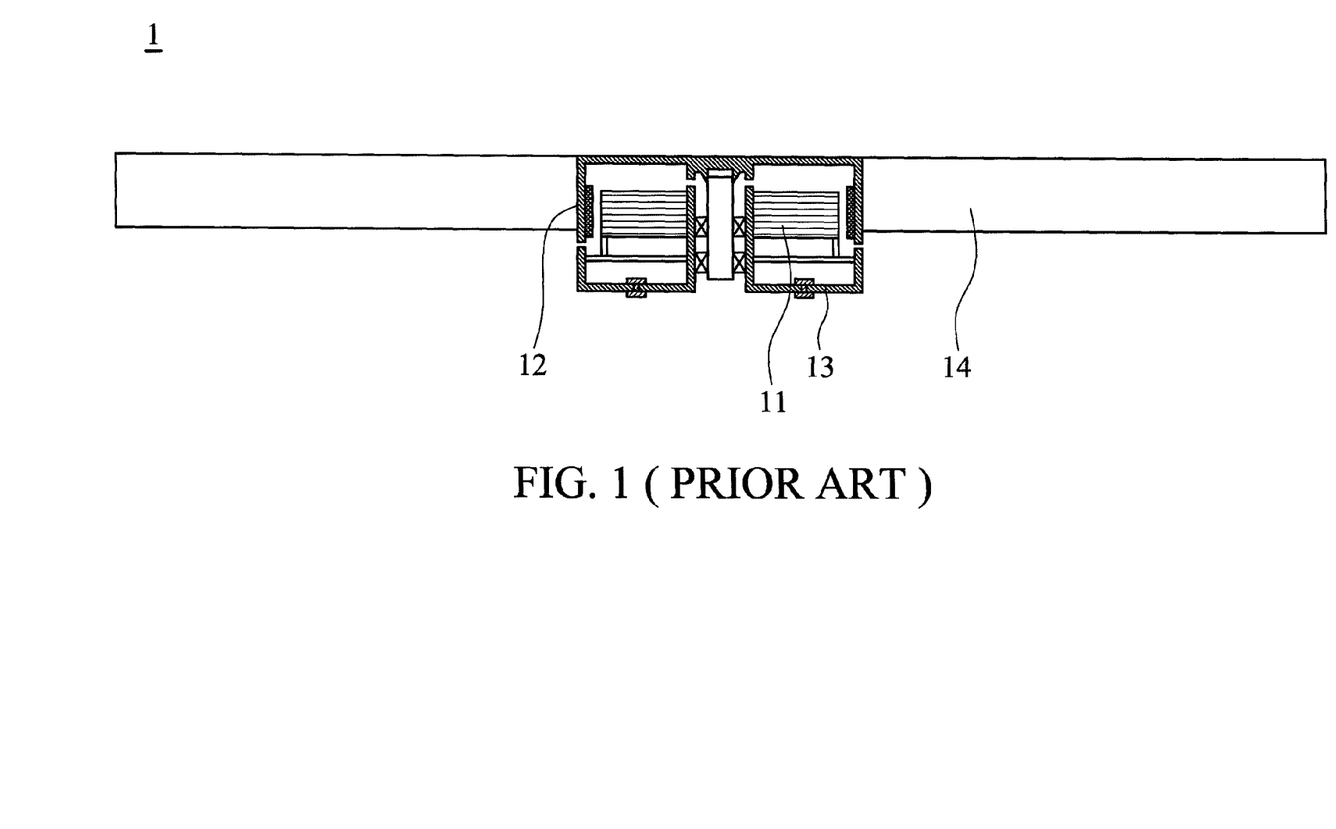
FIG. 1 is a partial cross section and plane view of a conventional fan.

Referring to FIG. 1, a conventional fan 1 comprises a stator 11, a rotor 12, a base 13, and an impeller 14. The stator 11 is disposed on the base 13. When the rotor 12 is subjected to application of an electric current to interact with the rotor 12, the rotor 12 and impeller 14 can rotate with respect to the base 13, generating a wind force effect.

To increase a wind amount of the conventional fan 1, the area of blades of the impeller 14 is increased. Namely, the conventional fan 1 has a large size. Nevertheless, there are some drawbacks for the conventional fan 1 with the large size.

When the weight of the blades of the impeller 14 is increased, the weight of the rotor 12 is increased correspondingly. Thus, a drive device with a large size is needed to provide a required torque. However, the entire conventional fan 1 becomes bulky and manufacturing costs thereof are increased.

Moreover, when the conventional fan 1 with the large size is operated, the rotational speed thereof is limited and the drive device thus cannot be operated with optimal efficiency. Meanwhile, power consumption of the conventional fan 1 with the large size is increased, thereby resulting in waste of power.

Hence, there is a need for a passive drive motor in which only a small drive device is required to drive a large loading mechanism or a large impeller to rotate, such that power consumption is reduced and energy efficiency is enhanced.

BRIEF SUMMARY OF THE INVENTION

A detailed description is given in the following embodiments with reference to the accompanying drawings.

An exemplary embodiment of the invention provides a passive drive motor comprising a base, a stator assembly, a rotating shaft, a rotor assembly, a first metal disk, at least one first magnet pair, and a second metal disk. The stator assembly is connected to the base. The rotating shaft is rotatably connected to the base. The rotor assembly is connected to the rotating shaft. The rotor assembly interacts with the stator assembly to rotate the rotating shaft. The first metal disk is rotated by the rotating shaft. The first magnet pair is disposed on the first metal disk. The second metal disk opposes the first magnet pair. When the rotating shaft rotates to drive the first metal disk to rotate, the first magnet pair disposed on the first metal disk magnetically interacts with the second metal disk, driving the second metal disk to rotate with respect to the first metal disk.

The passive drive motor further comprises at least one second magnet pair disposed on the second metal disk and opposing the first magnet pair. When the rotating shaft rotates to drive the first metal disk to rotate, the first magnet pair disposed on the first metal disk magnetically interacts with the second magnet pair disposed on the second metal disk, driving the second metal disk to rotate with respect to the first metal disk.

The first or second magnet pair comprises an axially magnetized magnet pair.

The first or second magnet pair comprises an integrally formed and annular magnet pair.

The first or second magnet pair comprises even magnets.

The first or second magnet pair comprises a radially magnetized magnet pair.

The second metal disk surrounds the first magnet pair.

The second magnet pair surrounds the first magnet pair.

The first and second metal disks comprise magnetic-permeable metal or non-magnetic-permeable metal.

The passive drive motor further comprises a first support frame and a second support frame. The first metal disk is connected to the rotating shaft by way of the first support frame. The second metal disk is fit on the rotating shaft by way of the second support frame.

Another exemplary embodiment of the invention provides a passive fan comprising a passive drive motor, at least one first fan blade, and at least one second fan blade. The at least one first fan blade is connected to the first metal disk of the passive drive motor. The at least one second fan blade is connected to the second metal disk of the passive drive motor.

The first support frame is connected to the rotating shaft of the passive drive motor, the first metal disk, and the first fan blade. The first fan blade is connected to the first metal disk through the first support frame.

The passive fan further comprises at least one third fan blade disposed between the second metal disk of the passive drive motor and the second fan blade. The at least one first fan blade rotates to generate airflow, driving the at least one third fan blade to rotate.

The second support frame is fit on the rotating shaft and is connected to the second metal disk and third fan blade. The third fan blade is connected to the second metal disk through the second support frame.

The passive fan further comprises an annular air-guiding mechanism disposed between the at least one second fan blade and the at least one third fan blade. The at least one second fan blade is connected to an outer wall of the annular air-guiding mechanism. The at least one third fan blade is connected to an inner wall of the annular air-guiding mechanism.

An accommodation space is formed and surrounded by the inner wall of the annular air-guiding mechanism. The at least one first fan blade extends into the accommodation space.

The first support frame is integrally formed with the first fan blade. The second support frame, second fan blade, third fan blade, and annular air-guiding mechanism are integrally formed with each other.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

First Embodiment

Figure 2:
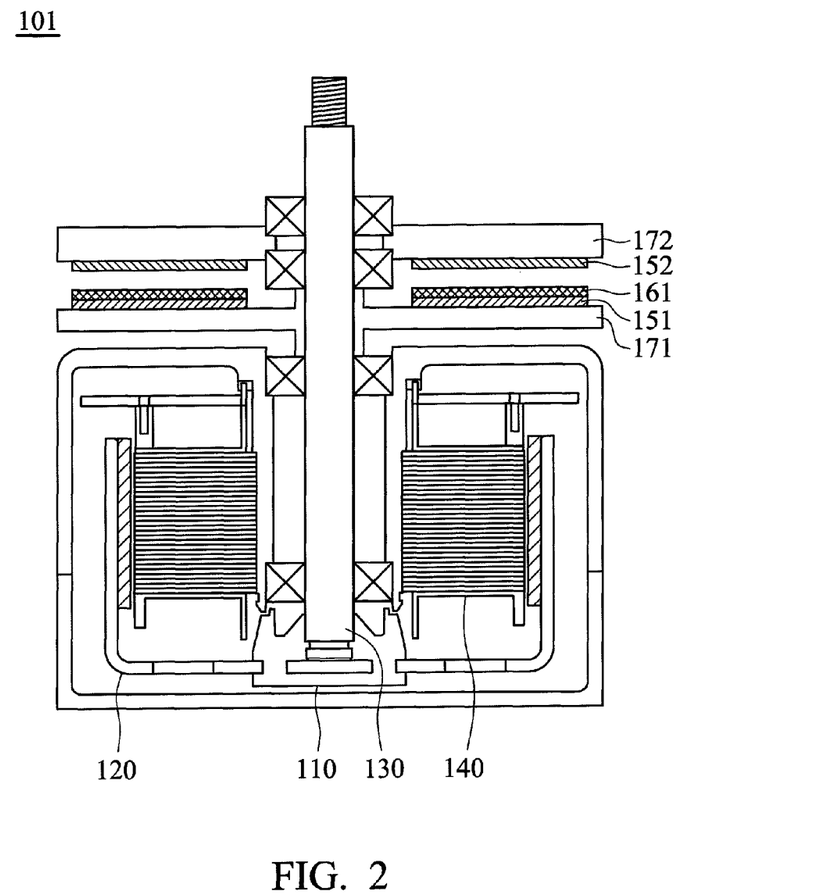
FIG. 2 is a partial cross section and plane view of a passive drive motor of a first embodiment of the invention.

Referring to FIG. 2, a passive drive motor 101 comprises a base 110, a rotor assembly 120, a rotating shaft 130, a stator assembly 140, a first metal disk 151, a plurality of first magnet pairs 161, and a second metal disk 152.

The rotor assembly 120 is connected to the rotating shaft 130.

The rotating shaft 130 is rotatably connected to the base 110.

The stator assembly 140 is connected to the base 110. Here, the rotor assembly 120 interacts with the stator assembly 140 to rotate the rotating shaft. Moreover, as interaction between the rotor assembly 120 and the stator assembly 140 is known from operation of a motor, description thereof is omitted for brevity.

The first metal disk 151 is connected to the rotating shaft 130. Specifically, the first metal disk 151 is connected to the rotating shaft 130 by way of a first support frame 171 (i.e. the first support frame 171 is connected to the rotating shaft 130, and the first metal disk 151 is connected to the first support frame 171). Here, the first support frame 171 may be connected to other loading mechanisms, providing functions of extended use. Moreover, the first metal disk 151 of this embodiment may be selectively composed of magnetic-permeable metal (e.g. steel) or non-magnetic-permeable metal (e.g. copper and aluminum).

Figure 3A:
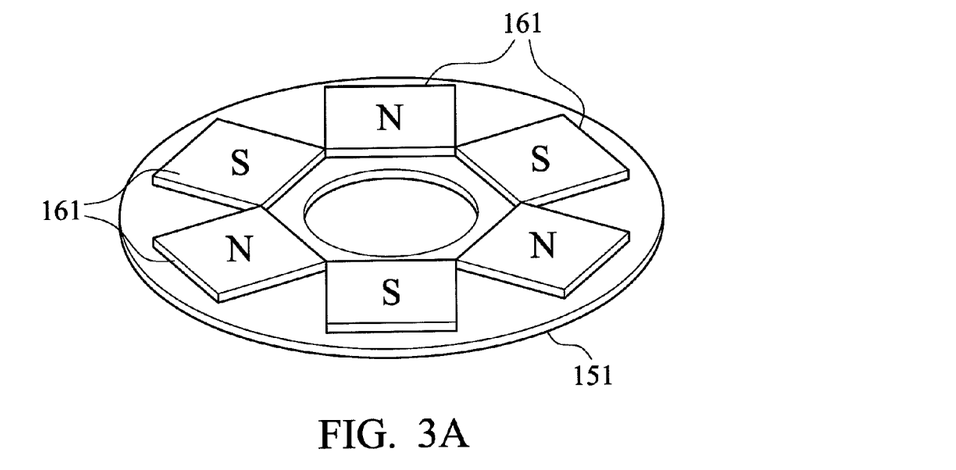
FIGS. 3A-3E are schematic perspective views showing, in the passive drive motor of the first embodiment of the invention, various first magnet pairs in combination with a first metal disk.
Figure 3B:
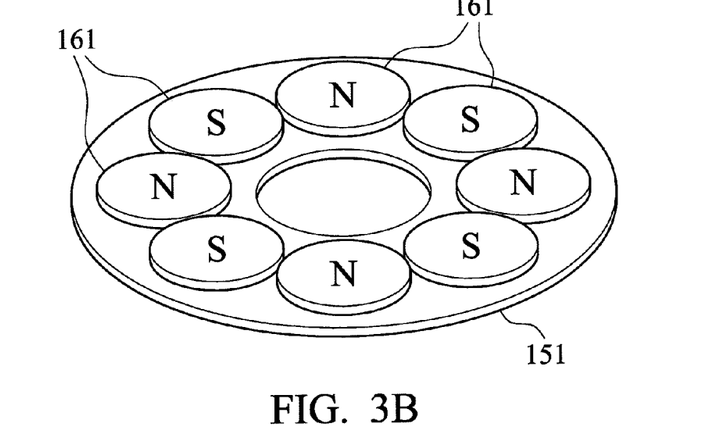
Figure 3C:
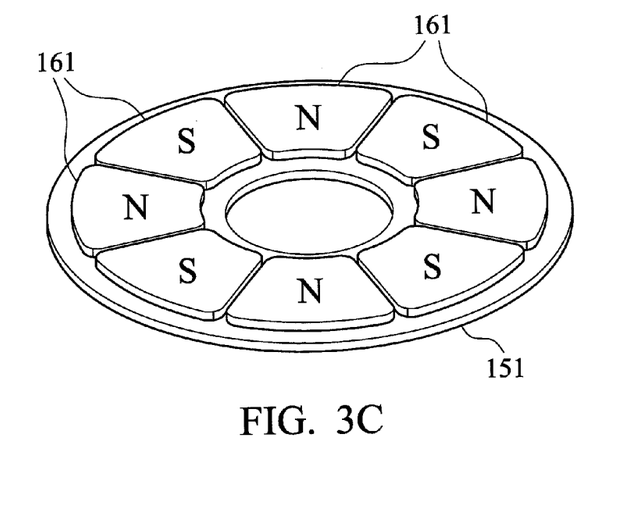
Figure 3D:
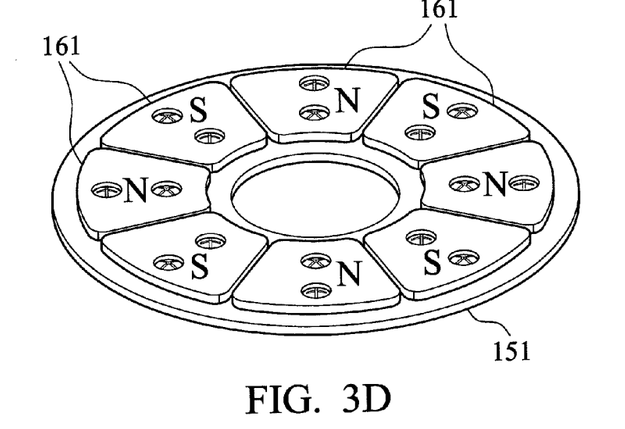
Figure 3E:
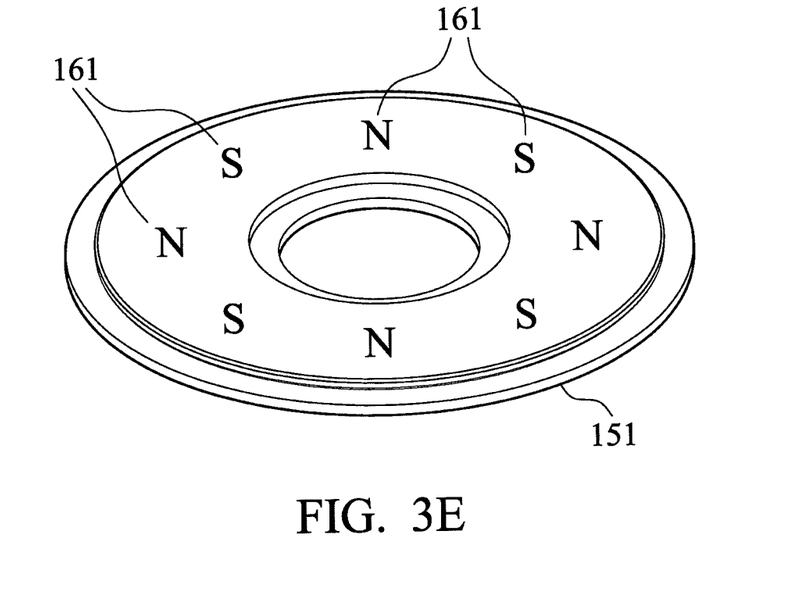

The first magnet pairs 161 are disposed on the first metal disk 151. As shown in FIGS. 3A, 3B, 3C, and 3D, each first magnet pair 161 comprises two opposite magnetic poles (i.e. N and S poles) with arbitrary geometric profiles. Specifically, each first magnet pair 161 of this embodiment is an axially magnetized magnet pair. Namely, the direction of a magnetic field or magnetic lines provided by the magnetic poles of each first magnet pair 161 is parallel to the central axis of the rotating shaft 130. Moreover, the first magnet pairs 161 may adhere to the first metal disk 151 (as shown by FIGS. 3A, 3B, and 3C) or may be fastened to the first metal disk 151 by bolts (as shown by FIG. 3D). Additionally, as shown in FIG. 3E, the first magnet pairs 161 of this embodiment may be integrally formed and annular magnet pairs.

As shown in FIG. 2, the second metal disk 152 is fit on the rotating shaft 130 and opposes the first magnet pairs 161. Specifically, the second metal disk 152 is fit on the rotating shaft 130 by way of a second support frame 172 (i.e. the second support frame 172 is fit on the rotating shaft 130 and is connected to the second metal disk 152). Here, the second support frame 172 may be also connected to the other loading mechanisms, providing the functions of extended use. Similarly, the second metal disk 152 of this embodiment may be selectively composed of magnetic-permeable metal (e.g. steel) or non-magnetic-permeable metal (e.g. copper and aluminum).

Figure 4:
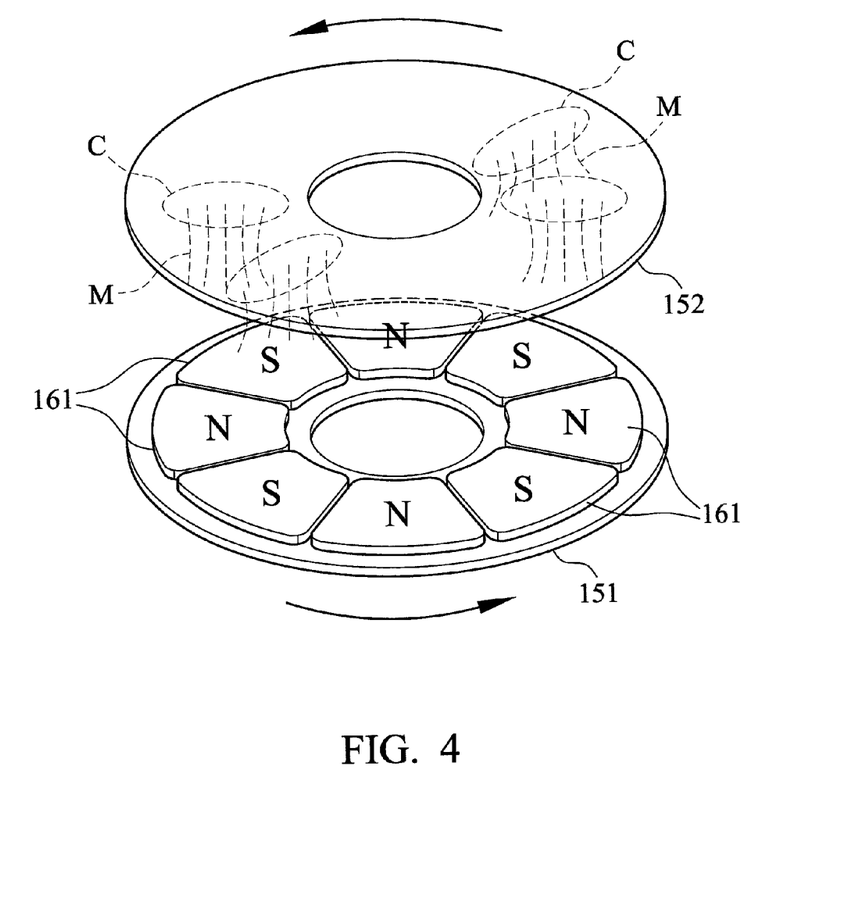
FIG. 4 is a schematic view showing operation of a part of the passive drive motor of the first embodiment of the invention.

Accordingly, when the rotating shaft 130 rotates to drive the first metal disk 151 to rotate, the first magnet pairs 161 disposed on the first metal disk 151 magnetically interacts with the second metal disk 152, driving the second metal disk 152 to rotate with respect to the first metal disk 151. Specifically, as shown in FIG. 4, when the rotating shaft 130 rotates, a vortex current C is induced on the second metal disk 152 by axial magnetic flux provided by the first magnet pairs 161 disposed on the first metal disk 151, and an electromagnetic field is then induced by the vortex current C and second metal disk 152. Thus, by magnetic interaction between the first metal disk 151 and the second metal disk 152, the second metal disk 152 can rotate with respect to the first metal disk 151.

Figure 5:
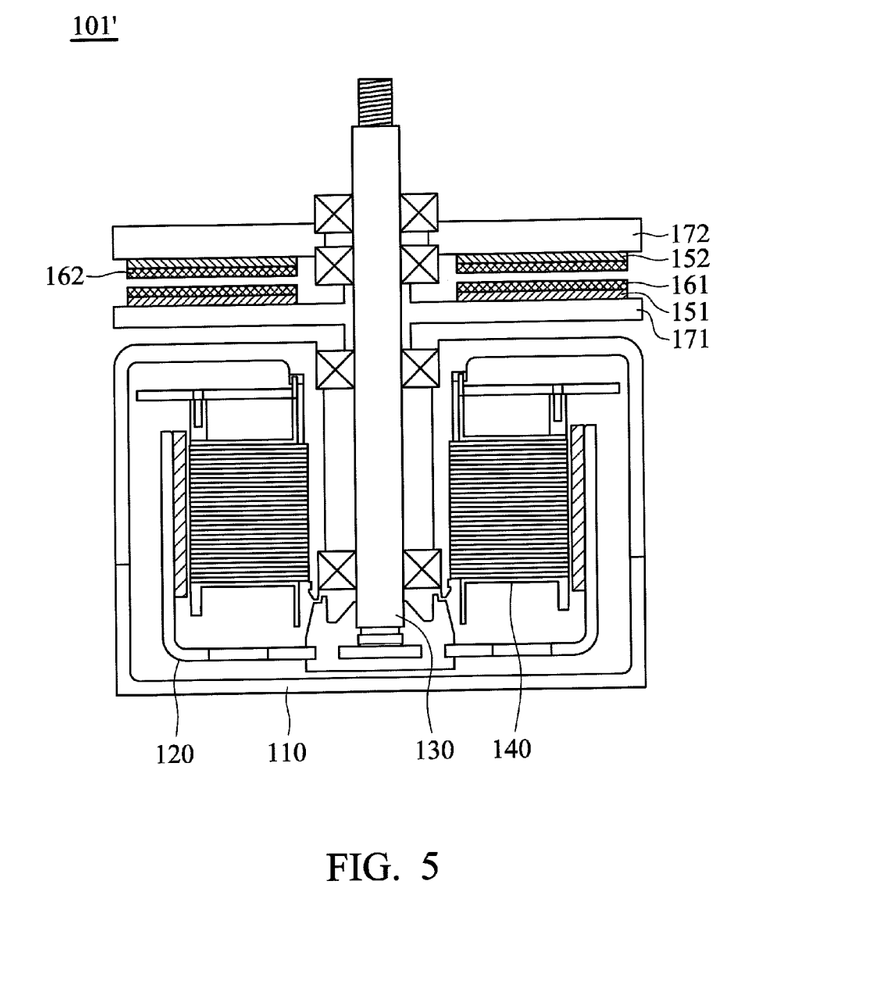
FIG. 5 is a partial cross section and plane view of another passive drive motor of the first embodiment of the invention.

Moreover, to enhance startup and acceleration capability of the second metal disk 152 from a stationary status to a rotating status, one or multiple second magnet pairs 162 may be selectively disposed on the second metal disk 152, as shown by another passive drive motor 101' in FIG. 5. Here, the second magnet pairs 162 oppose the first magnet pairs 161 and must be axially magnetized magnet pairs. Namely, the direction of a magnetic field or magnetic lines provided by magnetic poles of the second magnet pairs 162 is parallel to the central axis of the rotating shaft 130. Additionally, the second magnet pairs 162 may be integrally formed and annular magnet pairs.

Accordingly, when the rotating shaft 130 rotates to drive the first metal disk 151 to rotate, the first magnet pairs 161 disposed on the first metal disk 151 magnetically interacts with the second magnet pairs 162 disposed on the second metal disk 152, driving the second metal disk 152 to rotate with respect to the first metal disk 151.

Specifically, by varying the number, ratio, and/or profile of the magnet pairs disposed on the first metal disk 151 and/or second metal disk 152, the optimal startup and acceleration capability of the second metal disk 152 and an optimal difference of rotational speed between the first metal disk 151 and the second metal disk 152 can be obtained.

Accordingly, in the passive drive motors 101 and 101', as the rotational speed of the second metal disk 152 is less than that of the first metal disk 151, the second metal disk 152 can be used to drive a high-loading device or mechanism. Namely, the passive drive motors 101 and 101' can employ only a small drive device (i.e. a small rotor assembly 120 and a small stator assembly 140) to drive a large loading device or mechanism to operate, thereby reducing power consumption and enhancing efficiency of energy use.

The following description is directed to application of the passive drive motor 101.

Figure 6:
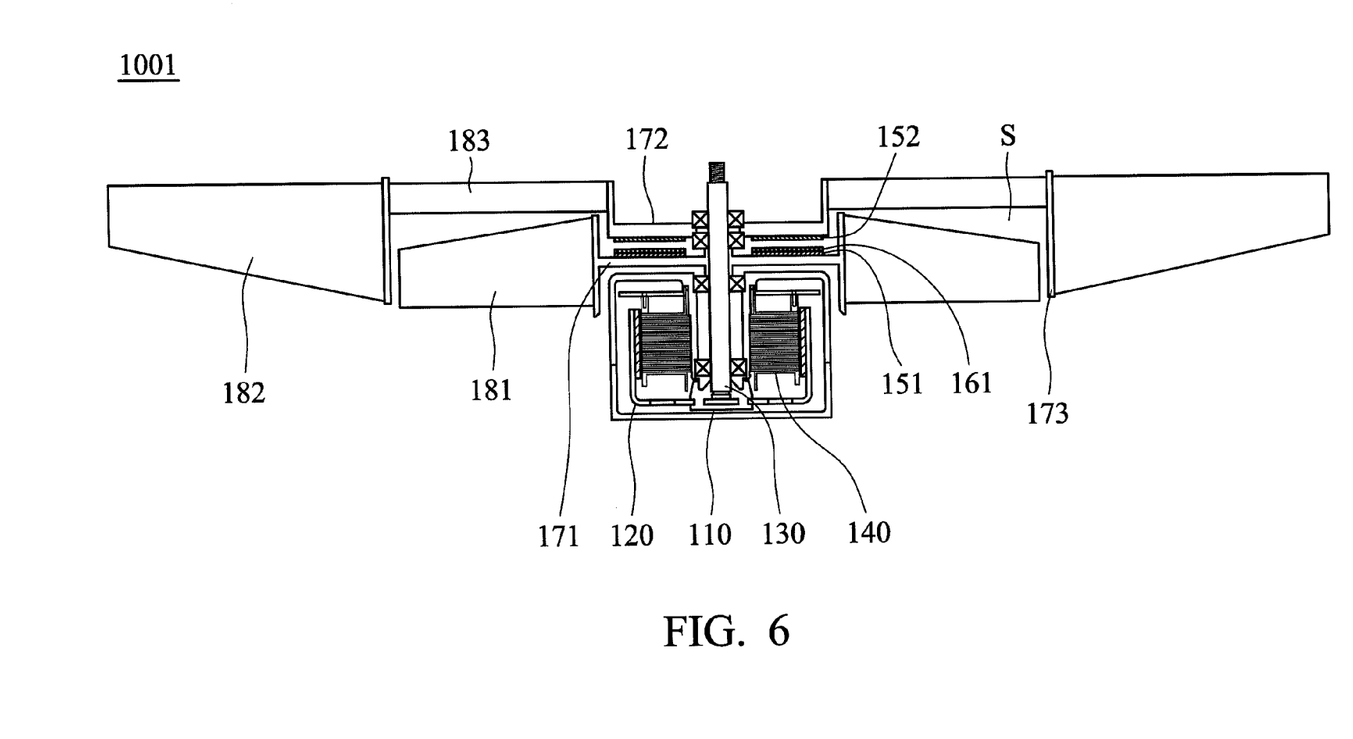
FIG. 6 is a partial cross section and plane view of a passive fan employing the passive drive motor of the first embodiment of the invention.

As shown in FIG. 6, a passive fan 1001 can use the passive drive motor 101 as a drive source. Here, in addition to the structure of the passive drive motor 101, the passive fan 1001 further comprises a plurality of first fan blades 181, a plurality of second fan blades 182, a plurality of third fan blades 183, and an annular air-guiding mechanism 173.

The first fan blades 181 are connected to the first support frame 171 (or the first fan blades 181 are connected to the first metal disk 151 by way of the first support frame 171).

The second fan blades 182 are connected to the second support frame 172 (or the second fan blades 182 are connected to the second metal disk 152 by way of the second support frame 172).

The third fan blades 183 are disposed between the second metal disk 152 of the passive drive motor 101 and the second fan blades 182. The first fan blades 181 rotate to generate airflow, driving the third fan blades 183 to rotate.

The air-guiding mechanism 173 is disposed between the second fan blades 182 and the third fan blades 183. The second fan blades 182 are connected to an outer wall of the annular air-guiding mechanism 173. The third fan blades 183 are connected to an inner wall of the annular air-guiding mechanism 173. Moreover, an accommodation space S is formed and surrounded by the inner wall of the annular air-guiding mechanism 173, and the first fan blades 181 extend into the accommodation space S.

Additionally, the first support frame 171 is integrally formed with the first fan blades 181, and the second support frame 172, second fan blades 182, third fan blades 183, and annular air-guiding mechanism 173 are integrally formed with each other.

As shown in FIG. 6, the size of the first fan blades 181 is less than that of the second fan blades 182. Namely, the first fan blades 181 can be regarded as a low-loading mechanism while the second fan blades 182 can be regarded as a high-loading mechanism. Thus, when the passive drive motor 101 is operated, the first fan blades 181 directly driven by the rotating shaft 130 are provided with a high rotational speed while the second fan blades 182 are provided with a low rotational speed. Accordingly, when the passive drive motor 101 simultaneously drives the second fan blades 182 with the larger size and the first fan blades 181 with the smaller size to rotate, the power consumption can be reduced and the efficiency of the energy use can be enhanced.

Second Embodiment

Elements corresponding to those in the first embodiment share the same reference numerals.

Figure 7:
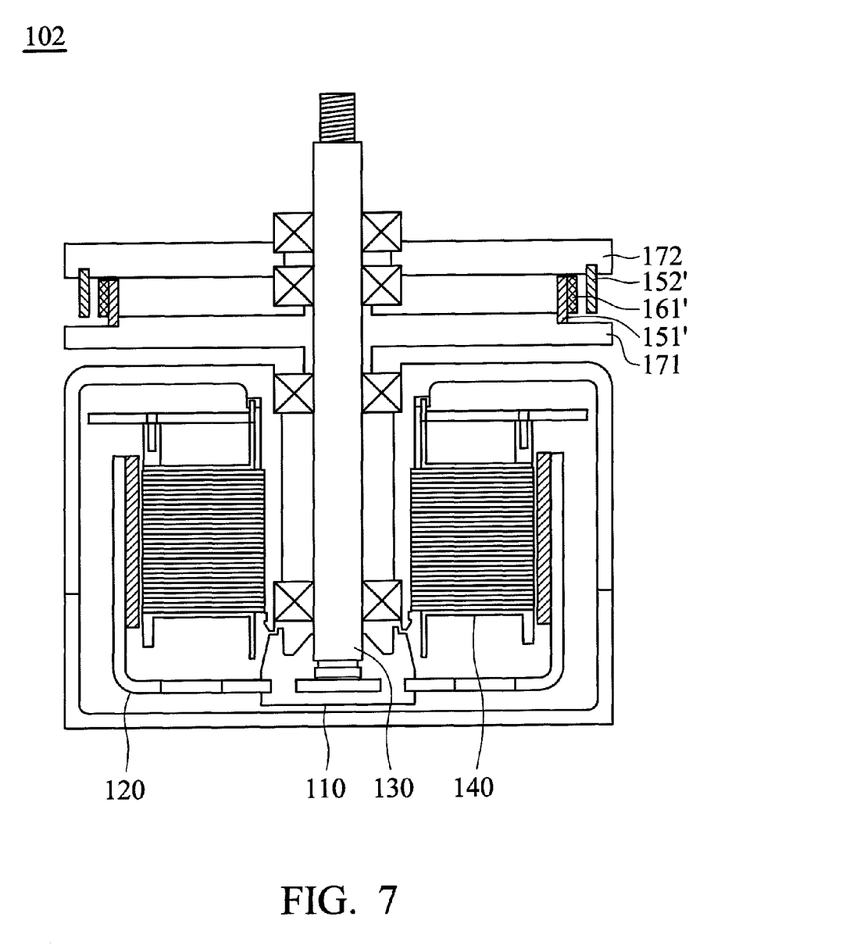
FIG. 7 is a partial cross section and plane view of a passive drive motor of a second embodiment of the invention.

Referring to FIG. 7, a passive drive motor 102 comprises a base 110, a rotor assembly 120, a rotating shaft 130, a stator assembly 140, a first metal disk 151', a plurality of first magnet pairs 161', and a second metal disk 152'.

The first metal disk 151' is connected to the rotating shaft 130. Specifically, the first metal disk 151' is connected to the rotating shaft 130 by way of a first support frame 171 (i.e. the first support frame 171 is connected to the rotating shaft 130, and the first metal disk 151' is connected to the first support frame 171). Similarly, the first support frame 171 may be connected to other loading mechanisms, providing functions of extended use. Moreover, the first metal disk 151' of this embodiment may be also selectively composed of magnetic-permeable metal (e.g. steel) or non-magnetic-permeable metal (e.g. copper and aluminum).

Figure 8:
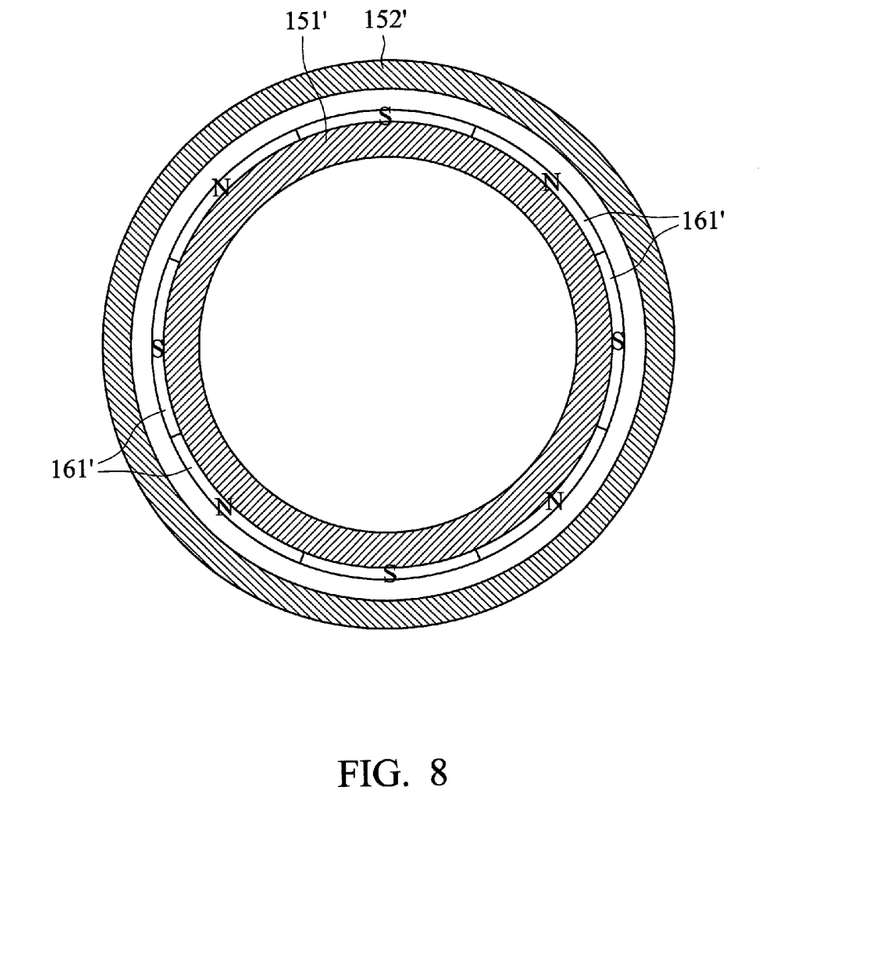
FIG. 8 is a schematic cross section of a part of the passive drive motor of the second embodiment of the invention.

The first magnet pairs 161' are disposed on the first metal disk 151'. As shown in FIG. 8, each first magnet pair 161' comprises two opposite magnetic poles (i.e. N and S poles) with arbitrary geometric profiles. Specifically, each first magnet pair 161' of this embodiment is a radially magnetized magnet pair. Namely, the direction of a magnetic field or magnetic lines provided by the magnetic poles of each first magnet pair 161' is perpendicular to the central axis of the rotating shaft 130. Similarly, the first magnet pairs 161' may adhere to the first metal disk 151' or may be fastened to the first metal disk 151' by bolts. Additionally, as shown in FIG. 8, the first magnet pairs 161' of this embodiment may be integrally formed and annular magnet pairs.

As shown in FIG. 7, the second metal disk 152' is fit on the rotating shaft 130 and opposes and surrounds the first magnet pairs 161'. Specifically, the second metal disk 152' is fit on the rotating shaft 130 by way of a second support frame 172 (i.e. the second support frame 172 is fit on the rotating shaft 130 and is connected to the second metal disk 152'). Similarly, the second support frame 172 may be connected to the other loading mechanisms, providing the functions of extended use. Moreover, the second metal disk 152' of this embodiment may be also selectively composed of magnetic-permeable metal (e.g. steel) or non-magnetic-permeable metal (e.g. copper and aluminum).

Accordingly, when the rotating shaft 130 rotates to drive the first metal disk 151' to rotate, the first magnet pairs 161' disposed on the first metal disk 151' magnetically interacts with the second metal disk 152', driving the second metal disk 152' to rotate with respect to the first metal disk 151'. Here, for related description of the above operation, reference may be made to the description in the first embodiment.

Figure 9:
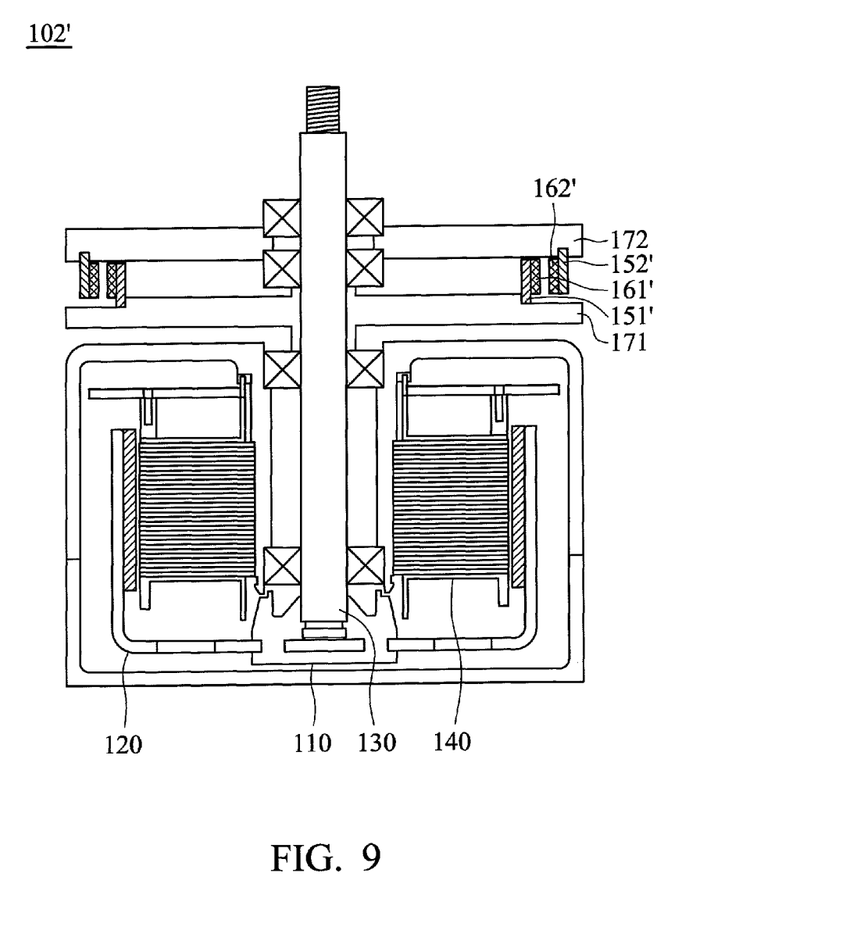
FIG. 9 is a partial cross section and plane view of another passive drive motor of the second embodiment of the invention.
Figure 10:
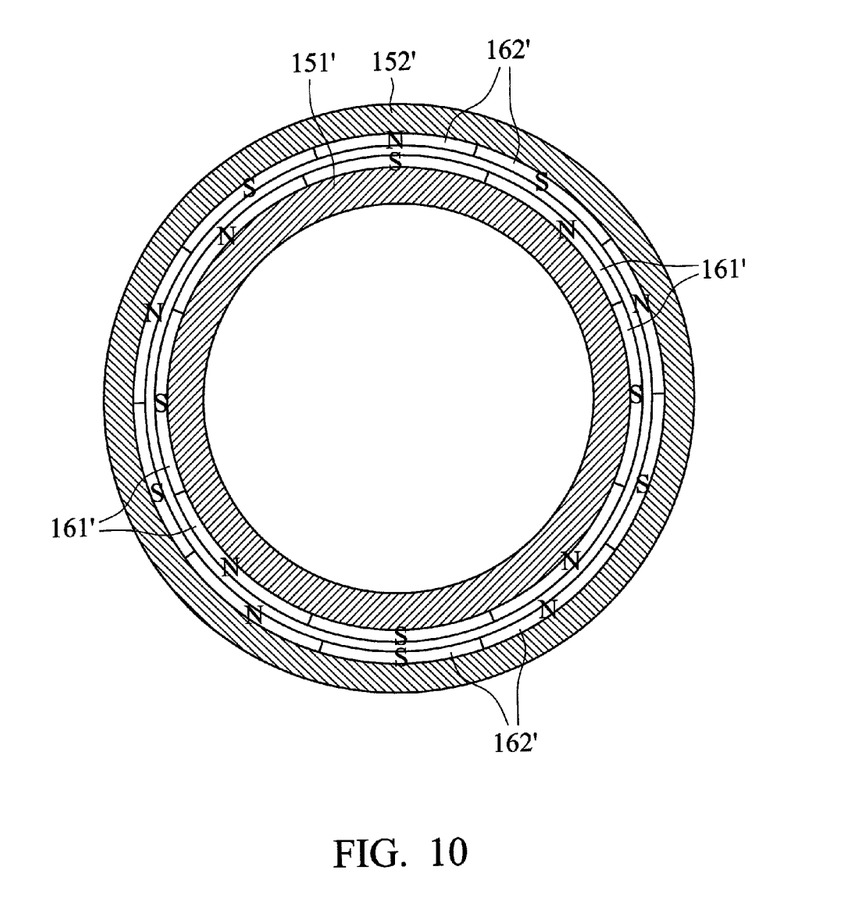
FIG. 10 is a schematic cross section of a part of the other passive drive motor of the second embodiment of the invention.

Moreover, to enhance startup and acceleration capability of the second metal disk 152' from a stationary status to a rotating status, one or multiple second magnet pairs 162' may be selectively disposed on the second metal disk 152', as shown by another passive drive motor 102' in FIG. 9. Here, as shown in FIG. 10, the second magnet pairs 162' oppose and surround the first magnet pairs 161' and must be radially magnetized magnet pairs. Namely, the direction of a magnetic field or magnetic lines provided by magnetic poles of the second magnet pairs 162' is also perpendicular to the central axis of the rotating shaft 130. Additionally, the second magnet pairs 162' may be also integrally formed and annular magnet pairs.

Accordingly, when the rotating shaft 130 rotates to drive the first metal disk 151' to rotate, the first magnet pairs 161' disposed on the first metal disk 151' magnetically interacts with the second magnet pairs 162' disposed on the second metal disk 152', driving the second metal disk 152' to rotate with respect to the first metal disk 151'.

Similarly, by varying the number, ratio, and/or profile of the magnet pairs disposed on the first metal disk 151' and/or second metal disk 152', the optimal startup and acceleration capability of the second metal disk 152' and an optimal difference of rotational speed between the first metal disk 151' and the second metal disk 152' can be obtained.

Similarly, in the passive drive motors 102 and 102', as the rotational speed of the second metal disk 152' is less than that of the first metal disk 151', the second metal disk 152' can be used to drive a high-loading device or mechanism. Namely, the passive drive motors 102 and 102' can employ only a small drive device (i.e. a small rotor assembly 120 and a small stator assembly 140) to drive a large loading device or mechanism to operate, thereby reducing power consumption and enhancing efficiency of energy use.

Structure, disposition, and function of other elements in this embodiment are the same as those in the first embodiment, and explanation thereof is omitted for simplicity.

The following description is directed to application of the passive drive motor 102.

Figure 11:
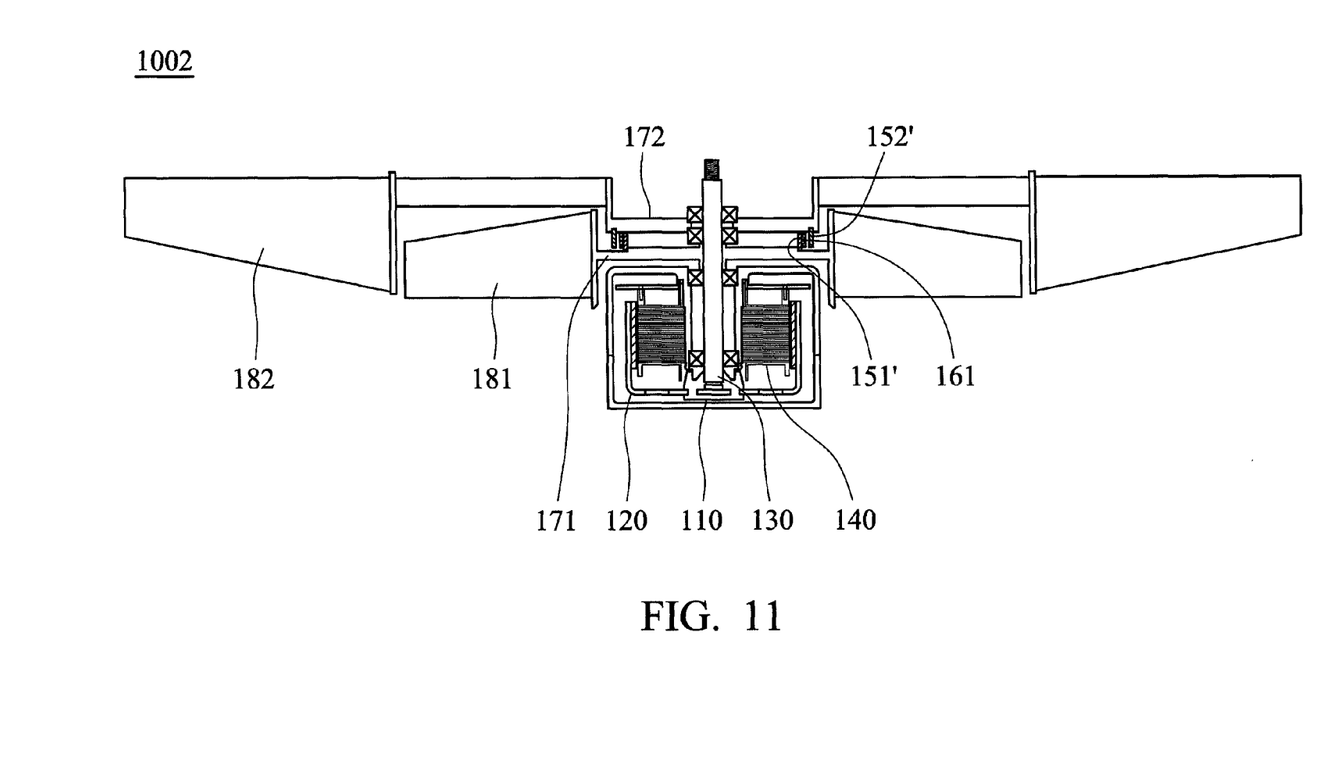
FIG. 11 is a partial cross section and plane view of a passive fan employing the passive drive motor of the second embodiment of the invention.

As shown in FIG. 11, a passive fan 1002 can use the passive drive motor 102 as a drive source. Here, in addition to the structure of the passive drive motor 102, the passive fan 1002 further comprises a plurality of first fan blades 181 and a plurality of second fan blades 182.

Similarly, the first fan blades 181 can be regarded as a low-loading mechanism while the second fan blades 182 can be regarded as a high-loading mechanism. Thus, when the passive drive motor 102 is operated, the first fan blades 181 directly driven by the rotating shaft 130 are provided with a high rotational speed while the second fan blades 182 are provided with a low rotational speed. Accordingly, when the passive drive motor 102 simultaneously drives the second fan blades 182 with the larger size and the first fan blades 181 with the smaller size to rotate, the power consumption can be reduced and the efficiency of the energy use can be enhanced. Moreover, as the second fan blades 182 are rotated by airflow generated by the first fan blades 181, the startup speed of the second fan blades 182 is slow. However, by means of the magnetic interaction between the first magnet pairs 161' disposed on the first metal disk 151' and the second metal disk 152', the second metal disk 152' can rotate with respect to the first metal disk 151', thereby increasing the startup speed of the second fan blades 182.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A passive drive motor, comprising:
   a base;
   a stator assembly connected to the base;
   a rotating shaft rotatably connected to the base;
   a rotor assembly connected to the rotating shaft, wherein the rotor assembly interacts with the stator assembly to rotate the rotating shaft;
   a first metal disk rotated by the rotating shaft;
   at least one first magnet pair disposed on the first metal disk;
   a second metal disk opposing the first magnet pair, wherein, when the rotating shaft rotates to drive the first metal disk to rotate, the first magnet pair disposed on the first metal disk magnetically interacts with the second metal disk, driving the second metal disk to rotate with respect to the first metal disk; and
   a first support frame and a second support frame, wherein the first metal disk is connected to the rotating shaft by way of the first support frame, and the second metal disk is fit on the rotating shaft by way of the second support frame.

2. The passive drive motor as claimed in claim 1, further comprising at least one second magnet pair disposed on the second metal disk and opposing the first magnet pair, wherein, when the rotating shaft rotates to drive the first metal disk to rotate, the first magnet pair disposed on the first metal disk magnetically interacts with the second magnet pair disposed on the second metal disk, driving the second metal disk to rotate with respect to the first metal disk.

3. The passive drive motor as claimed in claim 2, wherein the first or second magnet pair comprises an axially magnetized magnet pair.

4. The passive drive motor as claimed in claim 3, wherein the first or second magnet pair comprises an integrally formed and annular magnet pair.

5. The passive drive motor as claimed in claim 2, wherein the first or second magnet pair comprises even number of magnets.

6. The passive drive motor as claimed in claim 2, wherein the first or second magnet pair comprises a radially magnetized magnet pair.

7. The passive drive motor as claimed in claim 6, wherein the first or second magnet pair comprises an integrally formed and annular magnet pair.

8. The passive drive motor as claimed in claim 1, wherein the second metal disk surrounds the first magnet pair.

9. The passive drive motor as claimed in claim 2, wherein the second magnet pair surrounds the first magnet pair.

10. The passive drive motor as claimed in claim 1, wherein the first and second metal disks comprise magnetic-permeable metal or non-magnetic-permeable metal.

11. A passive fan, comprising:
    a passive drive motor as claimed in claim 1;
    at least one first fan blade connected to the first disk of the passive drive motor; and
    at least one second fan blade connected to the second metal disk of the passive drive motor.

12. The passive fan as claimed in claim 11, wherein the first support frame is connected to the rotating shaft of the passive drive motor, the first metal disk, and the first fan blade, and the first fan blade is connected to the first metal disk through the first support frame.

13. The passive fan as claimed in claim 12, further comprising at least one third fan blade disposed between the second metal disk of the passive drive motor and the second fan blade, and the at least one first fan blade rotates to generate airflow, driving the at least one third fan blade to rotate.

14. The passive fan as claimed in claim 13, wherein the second support frame is fit on the rotating shaft and is connected to the second metal disk and third fan blade, and the third fan blade is connected to the second metal disk through the second support frame.

15. The passive fan as claimed in claim 14, further comprising an annular air-guiding mechanism disposed between the at least one second fan blade and the at least one third fan blade, the at least one second fan blade is connected to an outer wall of the annular air-guiding mechanism, and the at least one third fan blade is connected to an inner wall of the annular air-guiding mechanism.

16. The passive fan as claimed in claim 15, wherein an accommodation space is formed and surrounded by the inner wall of the annular air-guiding mechanism, and the at least one first fan blade extends into the accommodation space.

17. The passive fan as claimed in claim 16, wherein the first support frame is integrally formed with the first fan blade, and the second support frame, second fan blade, third fan blade, and annular air-guiding mechanism are integrally formed with each other.

* * * * *